United States Patent
Dunning et al.

(10) Patent No.: US 8,349,062 B2
(45) Date of Patent: Jan. 8, 2013

(54) COMPOSITION FOR WASHING AND WAXING A MOTOR VEHICLE

(75) Inventors: Brent R Dunning, San Clemente, CA (US); Gary M Silvers, Newport Beach, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 190 days.

(21) Appl. No.: 13/005,939

(22) Filed: Jan. 13, 2011

(65) Prior Publication Data

US 2011/0172135 A1    Jul. 14, 2011

Related U.S. Application Data

(60) Provisional application No. 61/294,756, filed on Jan. 13, 2010.

(51) Int. Cl.
  *C09G 1/00*    (2006.01)
(52) U.S. Cl. .............. 106/3; 106/10; 106/271; 510/241; 510/242; 510/466
(58) Field of Classification Search ................ 106/3, 10, 106/271; 510/241, 242, 466
  See application file for complete search history.

(56) References Cited

U.S. PATENT DOCUMENTS

| | | | |
|---|---|---|---|
| 3,508,933 A | | 4/1970 | Yates |
| 4,347,333 A * | | 8/1982 | Lohr et al. ............ 524/269 |
| 5,258,063 A * | | 11/1993 | Cifuentes et al. ........ 106/3 |
| 5,782,962 A * | | 7/1998 | Burke et al. ........ 106/2 |
| 5,962,074 A * | | 10/1999 | Wollner .......... 427/322 |
| 5,968,238 A | | 10/1999 | Healy et al. |
| 6,235,824 B1 * | | 5/2001 | Vander Louw et al. ...... 524/278 |
| 6,355,261 B1 * | | 3/2002 | Bonda et al. ......... 424/401 |
| 6,506,715 B1 * | | 1/2003 | Schultz et al. ......... 510/189 |
| 6,669,763 B1 * | | 12/2003 | Ghodoussi .......... 106/10 |
| 7,300,976 B2 * | | 11/2007 | Johnson ........... 524/591 |
| 7,381,249 B2 * | | 6/2008 | Hasinovic et al. ........ 106/10 |
| 7,399,738 B1 * | | 7/2008 | Serobian .......... 510/241 |
| 7,541,323 B2 | | 6/2009 | Serobian |
| 2004/0110850 A1 * | | 6/2004 | Jordan et al. ......... 516/55 |
| 2005/0003219 A1 | | 1/2005 | Yonei et al. |
| 2007/0178239 A1 * | | 8/2007 | Kestell et al. ........ 427/393.4 |
| 2011/0172135 A1 * | | 7/2011 | Dunning et al. ........ 510/242 |
| 2012/0152148 A1 * | | 6/2012 | Dilley et al. ........ 106/5 |

FOREIGN PATENT DOCUMENTS

JP        11116988        4/1999

OTHER PUBLICATIONS

PCT International Search Report, PCT/US2011/021098, Mar. 2011.

* cited by examiner

*Primary Examiner* — Gregory Webb
(74) *Attorney, Agent, or Firm* — Philip P. Soo

(57) ABSTRACT

The invention is directed to a composition for simultaneously washing and waxing an automotive exterior surface. More particularly, this invention relates to a wash and wax composition that imparts a detergent-resistant wax to the vehicle surface. The composition comprises water, nano-scale particles of a wax, a surfactant, n-octyltriethoxysilane, diethoxyoctylsilyl trimethylsilyl ester of silicic acid, and an amino-functional siloxane or tetra(trimethylsiloxy) silane, wherein the wax particles, n-octyltriethoxysilane, diethoxyoctylsilyl trimethylsilyl ester of silicic acid, and amino-functional siloxane or tetra(trimethylsiloxy) silane form an emulsion or dispersion in the water.

18 Claims, No Drawings

COMPOSITION FOR WASHING AND WAXING A MOTOR VEHICLE

CROSS REFERENCE TO RELATED APPLICATION

This application claims the benefit of U.S. Provisional Patent Application No. 61/294,756, filed Jan. 13, 2010, the disclosure of which is incorporated by reference herein in its entirety.

FIELD OF THE INVENTION

This invention relates to a composition useful for washing and waxing the painted metal exterior surface of a motor vehicle. More particularly, this invention relates to a composition that both cleans the vehicle surface and simultaneously imparts a detergent-resistant wax to the vehicle surface.

BACKGROUND

Products for washing and waxing vehicles are ubiquitous. Those products for washing vehicles are typically based on blends of anionic surfactants. Anionic surfactants provide excellent, stable, soft, lubricious foams. In addition, anionic surfactants provide excellent soil removal and good wetting to automotive exterior surfaces and are easily and uniformly rinsed from the surface with water. Nonionic and amphoteric surfactants may also be used in combination with the anionic surfactant to aid in solubilizing the anionic surfactant and to enhance the detergency of the formulation.

Automotive wax compositions typically comprise wax or silicone based emulsions. They impart finishes with high gloss, shine, water resistance (beading) and durability through hydrogen bonding or simple Van der Waals forces. Most car wax formulations require a two step application process. The first step is applying the wax formulation to the vehicle surface and allowing the wax to dry. The second step involves wiping away excess wax and, in many cases, vigorously buffing the vehicle surface to obtain a uniform, glossy finish.

It is also known to combine both cleaners and wax components into a single composition. Formulations include, for example, an aqueous silicone-based wax emulsion comprising an anionic surfactant, a silicone oil, an amino-functional silicone, and a wax. Such compositions can clean the vehicle exterior and impart a glossy finish in one easy step, without the need to buff. However, convenience may be at the expense of durability since the wax finish will not withstand many subsequent washes.

There is a need therefore, for an automotive wash and wax composition that combines the superior cleaning power of a car wash with the superior durability, water resistance and high gloss of a wax composition. In particular, there is a need for automotive wash and wax composition that imparts superior durability, water resistance and high gloss having improved detergent resistance.

SUMMARY OF THE INVENTION

Compositions according to the invention are suitable for both washing and waxing the exterior surface of a motor vehicle, such as the painted metal exterior of an automobile, truck or other vehicle. Such compositions can simultaneously provide both a washing or cleaning function to remove dirt, grease, grime and other deposits from the painted metal exterior surface of the motor vehicle, and a waxing or polishing function to impart a durable, high gloss finish to the clean surface.

In one embodiment the invention provides a composition comprising water, nano-scale particles of a wax, a surfactant, n-octyltriethoxysilane, diethoxyoctylsilyl trimethylsilyl ester of silicic acid, and an amino-functional siloxane or tetra(trimethylsiloxy) silane, wherein the wax particles, n-octyltriethoxysilane, diethoxyoctylsilyl trimethylsilyl ester of silicic acid, and amino-functional siloxane or tetra(trimethylsiloxy) silane form an emulsion or dispersion in the water.

The wax may be a vegetable wax, a mineral wax, a microcrystalline wax, an animal wax, or a synthetic wax, but preferably is a vegetable wax such as carnauba wax, especially having particles of about 250 nm in size. The wax preferably comprises about 4 to 20 weight percent of the composition, more preferably about 6 to 10 weight percent.

The surfactant helps to clean the exterior surface of dirt, grime and grease. Surfactants useful in the compositions of the invention include anioinic surfactants, nonionic surfactants, amphoteric surfactants, and blends thereof. Especially preferred is for the surfactant to be sodium lauryl sulfate, cocamide DEA, cocamidopropyl betaine, modified coconut diethanolamide, polyethylene oxide lauryl ether, or combinations thereof. The surfactant preferably comprises about 2 to 30 weight percent of the composition, more preferably about 12 to 20 weight percent of the composition.

Also preferred are compositions wherein the combination of n-octyltriethoxysilane, diethoxyoctylsilyl trimethylsilyl ester of silicic acid, and amino-functional siloxane or tetra (trimethylsiloxy) silane comprises about 0.2 to 1 weight percent of the composition, more preferably about 0.3 to 0.5 weight percent of the composition.

Compositions according to the invention are capable of removing dirt from a painted exterior metal surface of a motor vehicle. Accordingly, in another embodiment, the invention provides a method of cleaning a painted metal exterior surface of a motor vehicle comprising the steps of providing a painted metal exterior surface of a motor vehicle having dirt thereon, applying a composition such as described above to the surface, rubbing the composition on the surface, and rinsing the surface with water to remove the dirt.

Compositions according to the invention are also capable of imparting a glossy finish to the painted exterior metal surface of a motor vehicle. Accordingly, in another embodiment, the invention provides a method of waxing a painted metal exterior surface of a motor vehicle comprising the steps of providing a painted metal exterior surface of a motor vehicle, applying a composition such as described above to the surface, rubbing the composition on the surface, and rinsing the surface with water to impart a glossy finish to the surface.

Most advantageously, compositions according to the invention are capable of removing dirt from the painted exterior metal surface of a motor vehicle and imparting a glossy finish to the surface in a single application. Thus, in a further embodiment, the invention provides a method of cleaning and waxing a painted metal exterior surface of a motor vehicle comprising the steps of providing a painted metal exterior surface of a motor vehicle having dirt thereon, applying a composition such as described above to the surface, rubbing the composition on the surface, and rinsing the surface with water to simultaneously remove the dirt and impart a glossy finish to the surface. Compositions according to the invention provide a high-gloss, durable shine to the automotive exterior surface that is detergent resistant.

DETAILED DESCRIPTION

Compositions according to the invention are suitable for both washing and waxing the exterior surface of a motor vehicle, such as the painted metal exterior of an automobile, truck or other vehicle. Such compositions can simultaneously provide both a washing or cleaning function to remove dirt, grease, grime and other deposits from the painted metal exterior surface of the motor vehicle, and a waxing or polishing function to impart a durable, high gloss finish to the clean surface. Compositions according to the invention comprise (and more preferably, consist essentially of) water, nano-scale particles of a wax, a surfactant, n-octyltriethoxysilane, diethoxyoctylsilyl trimethylsilyl ester of silicic acid, and an amino-functional siloxane or tetra(trimethylsiloxy) silane, wherein the wax particles, n-octyltriethoxysilane, diethoxyoctylsilyl trimethylsilyl ester of silicic acid, and amino-functional siloxane or tetra(trimethylsiloxy) silane form an emulsion or dispersion in the water.

Waxes suitable for use in the compositions of the invention include vegetable waxes such as carnauba, candelilla, and ouricury wax; mineral waxes such as montan, paraffin, and microcrystalline wax; animal waxes, such as beeswax; and synthetic waxes such as amide waxes and silicone waxes. More preferably, the wax is a vegetable wax such as carnauba wax. Useful waxes can form an emulsion or dispersion in water, the wax particles of the emulsion or dispersion being on the nano-scale, for example on the order of about 250 nanometers. A particularly useful wax is No. 1 Yellow Carnauba Wax, such as commercially available under the trade designation "CARNAUBA MILK" from Koster Keunen, LLC, Watertown, Conn. which provides a highly stable, 250 nm dispersion of 30% of No. 1 Yellow Carnauba wax in water. Compositions of the invention preferably include about 4 to 20 weight percent of a wax, more preferably about 6 to 10 weight percent.

Surfactants useful in the compositions of the invention include anioinic surfactants, nonionic surfactants, amphoteric surfactants, and blends thereof. Specific examples of suitable surfactants include sodium lauryl sulfate, cocamide DEA, cocamidopropyl betaine, modified coconut diethanolamide, and polyethylene oxide lauryl ether. Commercially available materials that have been found to be useful include "CALBLEND CLEAR" from Pilot Chemical Company, Cincinnati, Ohio (a blend of sodium lauryl sulfate, cocamide DEA, and cocamidopropyl betaine) and "CD-6" from Pilot Chemical Company (a modified coconut diethanolamide. Compositions of the invention preferably include about 2 to 30 weight percent, more preferably about 12 to 20 weight percent of surfactant, especially nonioinic and anioinic/nonionic surfactant blends.

The compositions of the invention further include about 0.2 to 1 weight percent of a silicone emulsion (water being one component of the composition of the invention), more preferably about 0.3 to 0.5 weight percent. More preferably, the silicone emulsion is a combination of n-octyltriethoxysilane, diethoxyoctylsilyl trimethylsilyl ester of silicic acid, and an amino-functional siloxane or tetra(trimethylsiloxy) silane. Amino-functional siloxanes useful in the present invention include silicone polymers that contain primary, secondary or tertiary amino functional groups, obtained from a variety of manufacturers, such as Momentive Performance Materials, Inc., Albany, N.Y., and Dow Corning Corporation. Suitable, commercially available examples of the silicone emulsion include "IE-6683" and "XIAMETER OFS-6595" from Dow Corning Corporation, Midland, Mich. More specifically, compositions that contain the following amounts of n-octyltriethoxysilane, diethoxyoctylsilyl trimethylsilyl ester of silicic acid, and amino-functional siloxane are regarded as preferred and more preferred:

|  | Preferred Weight Percent | More Preferred Weight Percent |
| --- | --- | --- |
| n-octyltriethoxysilane | about 0.03 to 0.5 | 0.045 to about 0.12 |
| diethoxyoctylsilyl trimethylsilyl ester of silicic acid | about 0.03 to 0.5 | 0.045 to about 0.12 |
| amino-functional siloxane | 0.002 to about 0.5 | 0.003 to about 0.015 |

Optional components that may be included in the compositions of the invention include UV absorbers such as benzotriazoles, benzophenones, and the like, polymeric UV absorbers having a UV chromophore attached to a polymer backbone, solvents such as mineral oil and butyl cellosolve, fragrances, colorants, preservatives, thickening agents, abrasive polishing agents such as silicas, zeolites, and the like, and neutralizing/stabilizing agents such as mineral acids or organic acids. These optional components may comprise up to about 3 weight percent of the compositions, preferably about 1 weight percent.

The composition is applied to a pre-wetted motor vehicle exterior surface with a pre-wetted cloth, sponge, or mitt. The composition can be diluted with water prior to application, if desired. Alternatively, it may be sprayed on the vehicle.

The composition is rubbed onto the wet motor vehicle exterior surface, preferably in a circular motion. After the motor vehicle surface has been coated with the composition, the coated surface is dried until a translucent film is formed thereon. When the surface is substantially dry, it is rinsed with a sufficient quantity of water to remove the formed film and substantially all of the surfactant residue and any soil particles present from the surface, leaving behind a wax and silicone-based protective film on the motor vehicle surface. The motor vehicle surface can be towel dried after rinsing. A uniform, durable, high-gloss, water resistant, protective film is thus obtained, without the need for buffing or additional wiping away of excess polish as is generally required with conventional car wax products.

When referred to herein, the viscosity of an example is quoted as a dynamic viscosity in Pascal·second (P·s) measured at 70 degrees Fahrenheit (° F.) (21.1 degrees Centigrade (° C.)), unless otherwise specified.

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:

CALB-C refers to an aqueous anionic/nonionic surfactant blend, commercially available under the trade designation "CALBLEND CLEAR" from Pilot Chemical Company, Cincinnati, Ohio.

CD6 refers to an aqueous anionic/amide surfactant blend, commercially available under the trade designation "CALSUDS CD-6" from Pilot Chemical Company.

C-MILK refers to an aqueous dispersion of No. 1 Yellow Carnauba Wax, commercially available under the trade designation "CARNAUBA MILK" from Koster Keunen, LLC, Watertown, Conn.

GE-2163 refers to a polydimethylsiloxane emulsion, commercially available under the trade designation "SM-2163" from Momentive Performance Materials, Inc., Albany, N.Y.
GREEN-8 refers to a yellow pigment, commercially available under the trade designation "D&C GREEN #8" from Lubrizol Corporation, Wickliffe, Ohio.
IE-6683 refers to an aqueous silicone emulsion, commercially available under the trade designation "IE-6683" from Dow Corning Corporation, Midland, Mich.
KATH CG refers to an aqueous biocide, commercially available under the trade designation "KATHON CG" from Buckman Laboratories International, Inc., Memphis, Tenn.
PGB refers to a pomegranate grapefruit blackberry fragrance, commercially available under the trade designation "O.S. POMEGRANTE-GRAPEFRUIT-BLACKBERRY FRAGRANCE", from International Aromatics, S.A.E., Alexandria, Egypt.
S-3041 refers to an aqueous dispersion of an ultraviolet absorber, commercially available under the trade designation "SANDUVOR 3041" from Clariant Corporation, Charlotte, N.C.
YELLOW-23 refers to a yellow pigment, commercially available under the trade designation "ACID YELLOW #23" from Lubrizol Corporation.

EXAMPLES

A series of compositions was prepared according to the following general procedure, as listed in Tables 1 and 2. Deionized water at 70° F. (21.1° C.) was charged into a 1 liter glass beaker. KATH CG was added and the mixture stirred for 1 minute using a low shear mixer, model "IKA RW20", from IKA Works, Inc. Wilmington, N.C. Pigments were then added, followed by CALB-C, and stirring continued for one minute after each component was added. The wax emulsion was added and stirring continued until homogeneous. The silicone emulsion was then added and again, the mixture stirred until homogeneous. S-3041 was added, followed by the fragrance and stirred for an additional minute after each addition. Finally, CD-6 was added and stirring continued until homogeneous.

Examples are identified in Table 1.

TABLE 1

| Component | Example 1 | 2 | 3 | 4 | 5 | 6 | 7 |
|---|---|---|---|---|---|---|---|
| Water | 58.85 | 56.85 | 57.85 | 57.35 | 56.60 | 56.70 | 62.90 |
| CALB-C | 35.00 | 35.00 | 35.00 | 35.00 | 35.00 | 35.00 | 26.00 |
| CD-6 | 4.00 | 4.00 | 4.50 | 4.00 | 5.25 | 5.25 | 8.25 |
| C-MILK | 0.50 | 1.50 | 0.75 | 1.50 | 1.50 | 1.50 | 1.50 |
| GE-2163 | 0 | 1.00 | 0 | 0 | 0 | 0 | 0 |
| GREEN-8 | 0 | 0 | 0 | 0 | 0 | 0.40 | 0.15 |
| IE-6683 | 0.50 | 0.50 | 0.75 | 1.00 | 0.50 | 0.40 | 0.30 |
| KATH CG | 0.05 | 0.05 | 0.05 | 0.05 | 0.05 | 0.05 | 0.05 |
| OFS-6595 | 0 | 0 | 0 | 0 | 0 | 0 | 0 |
| PBG | 0.30 | 0.30 | 0.30 | 0.30 | 0.30 | 0.30 | 0.20 |
| S-3041 | 0.30 | 0.30 | 0.30 | 0.30 | 0.30 | 0.30 | 0.30 |
| YELLOW-23 | 0.50 | 0.50 | 0.50 | 0.50 | 0.50 | 0.1 | 0.35 |
| pH | 8.70 | 8.64 | 8.98 | 8.96 | 9.07 | 8.93 | 9.00 |
| Viscosity | 3.86 | 3.64 | 3.01 | 2.87 | 6.42 | 5.18 | 4.71 |

The present invention may be embodied in other specific forms without departing from the spirit or essential attributes thereof and accordingly, reference should be made to the appended claims rather than to the foregoing specification as indicating the scope of the invention.

What is claimed is:

1. A composition comprising water, nano-scale particles of a wax, a surfactant, n-octyltriethoxysilane, diethoxyoctylsilyl trimethylsilyl ester of silicic acid, and an amino-functional siloxane or tetra(trimethylsiloxy) silane, wherein the wax particles, n-octyltriethoxysilane, diethoxyoctylsilyl trimethylsilyl ester of silicic acid, and amino-functional siloxane or tetra(trimethylsiloxy) silane form an emulsion or dispersion in the water.

2. A composition according to claim 1, wherein the wax is a vegetable wax, a mineral wax, a microcrystalline wax, an animal wax, or a synthetic wax.

3. A composition according to claim 2, wherein the wax is a vegetable wax.

4. A composition according to claim 3, wherein the vegetable wax is carnauba wax.

5. A composition according to claim 4, wherein the particles of wax carnauba have a size of about 250 nm.

6. A composition according to claim 1, comprising about 4 to 20 weight percent wax.

7. A composition according to claim 1, wherein the surfactant is sodium lauryl sulfate, cocamide DEA, cocamidopropyl betaine, modified coconut diethanolamide, polyethylene oxide lauryl ether, or combinations thereof.

8. A composition according to claim 1, wherein the surfactant comprises about 2 to 30 weight percent of the composition.

9. A composition according to claim 1 wherein the combination of n-octyltriethoxysilane, diethoxyoctylsilyl trimethylsilyl ester of silicic acid, and amino-functional siloxane or tetra(trimethylsiloxy) silane comprises about 0.2 to 1 weight percent of the composition.

10. A composition according to claim 1 wherein the combination of—octyltriethoxysilane, diethoxyoctylsilyl trimethylsilyl ester of silicic acid, and amino-functional siloxane or tetra(trimethylsiloxy) silane comprises about 0.3 to 0.5 weight percent of the composition.

11. A composition according to claim 1 that is capable of removing dirt from a painted exterior metal surface of a motor vehicle and imparting a glossy finish to the surface in a single application.

12. A composition comprising water, nano-scale particles of a wax, a surfactant, n-octyltriethoxysilane, diethoxyoctylsilyl trimethylsilyl ester of silicic acid, and an amino-functional siloxane, wherein the wax particles, n-octyltriethoxysilane, diethoxyoctylsilyl trimethylsilyl ester of silicic acid, and amino-functional siloxane form an emulsion or dispersion in the water.

13. A composition according to claim 12 comprising about 0.03 to 0.5 weight percent n-octyltriethoxysilane, about 0.03 to 0.5 weight percent diethoxyoctylsilyl trimethylsilyl ester of silicic acid, and about 0.002 to about 0.5 weight percent amino-functional siloxane.

14. A composition according to claim 13 comprising about 0.045 to 0.12 weight percent n-octyltriethoxysilane, about 0.045 to 0.12 weight percent diethoxyoctylsilyl trimethylsilyl ester of silicic acid, and about 0.003 to 0.015 weight percent amino-functional siloxane.

15. A composition comprising water, nano-scale particles of a wax, a surfactant, n-octyltriethoxysilane, diethoxyoctylsilyl trimethylsilyl ester of silicic acid, and tetra(trimethylsiloxy) wherein the wax particles, n-octyltriethoxysilane, diethoxyoctylsilyl trimethylsilyl ester of silicic acid, and tetra(trimethylsiloxy) silane form an emulsion or dispersion in the water.

16. A method of cleaning a painted metal exterior surface of a motor vehicle comprising the steps of providing a painted metal exterior surface of a motor vehicle having dirt thereon, applying a composition according to claim 1 to the surface, rubbing the composition on the surface, and rinsing the surface with water to remove the dirt.

17. A method of waxing a painted metal exterior surface of a motor vehicle comprising the steps of providing a painted metal exterior surface of a motor vehicle, applying a composition according to claim 1 to the surface, rubbing the composition on the surface, and rinsing the surface with water to impart a glossy finish to the surface.

18. A method of cleaning and waxing a painted metal exterior surface of a motor vehicle comprising the steps of providing a painted metal exterior surface of a motor vehicle having dirt thereon, applying a composition according to claim 1 to the surface, rubbing the composition on the surface, and rinsing the surface with water to simultaneously remove the dirt and impart a glossy finish to the surface.

* * * * *

UNITED STATES PATENT AND TRADEMARK OFFICE
CERTIFICATE OF CORRECTION

PATENT NO. : 8,349,062 B2  
APPLICATION NO. : 13/005939  
DATED : January 8, 2013  
INVENTOR(S) : Brent R. Dunning et al.

Page 1 of 1

It is certified that error appears in the above-identified patent and that said Letters Patent is hereby corrected as shown below:

Column 2
Line 21, Delete "anioinic" and insert -- anionic --, therefor.

Column 3
Line 41, Delete "anioinic" and insert -- anionic --, therefor.
Line 53, Delete "nonioinic" and insert -- nonionic --, therefor.
Line 53, Delete "anioinic" and insert -- anionic --, therefor.
Line 61, Delete "silioxane" and insert -- siloxane --, therefor.

Column 5
Line 16, Delete "POMEGRANTE" and insert -- POMEGRANATE --, therefor.

Column 6
Line 34, In Claim 10,
delete "–octyltriethoxysilane," and insert -- n–octyltriethoxysilane, --, therefor.

Signed and Sealed this
Second Day of April, 2013

Teresa Stanek Rea
*Acting Director of the United States Patent and Trademark Office*